Patented Oct. 22, 1929

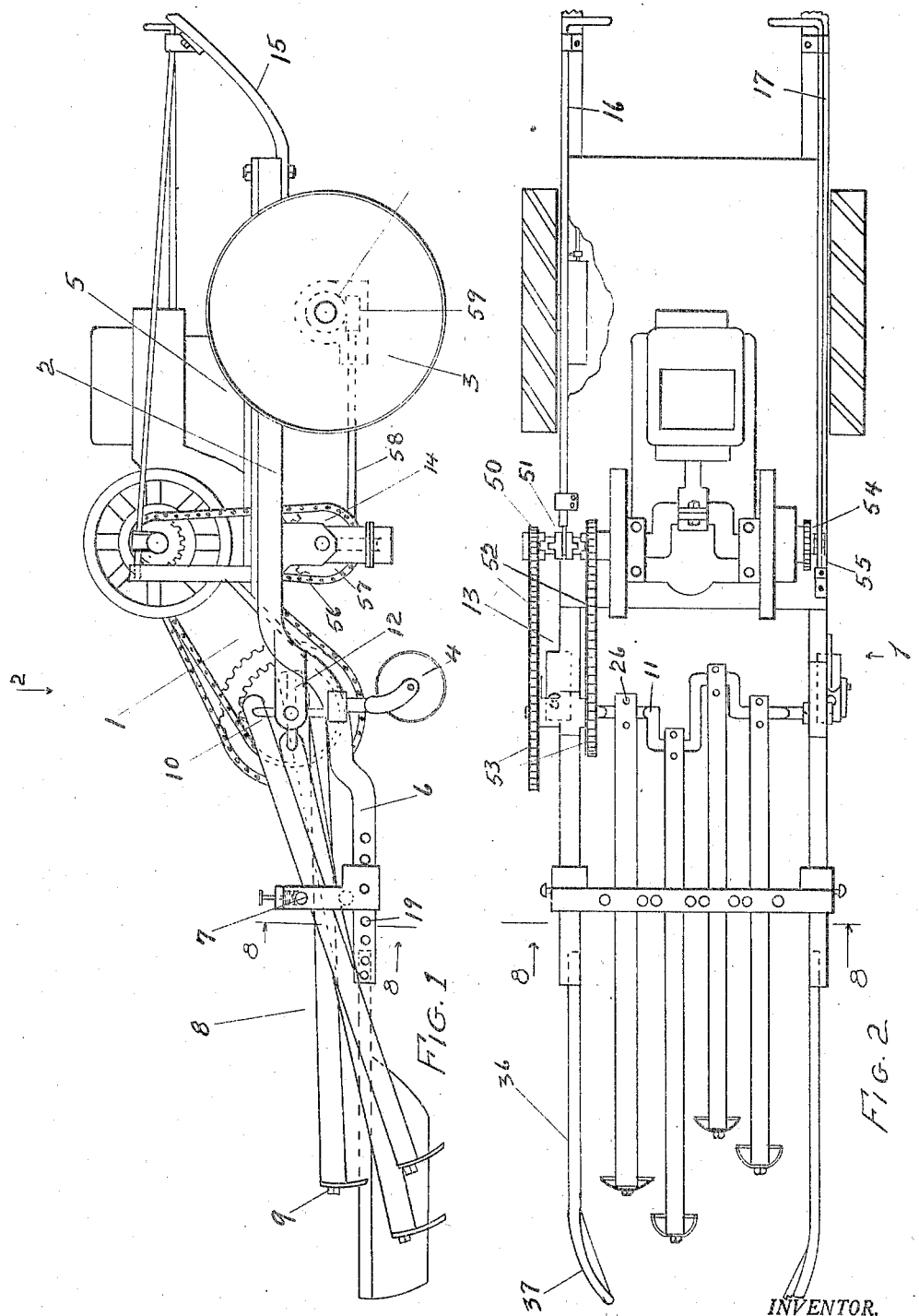

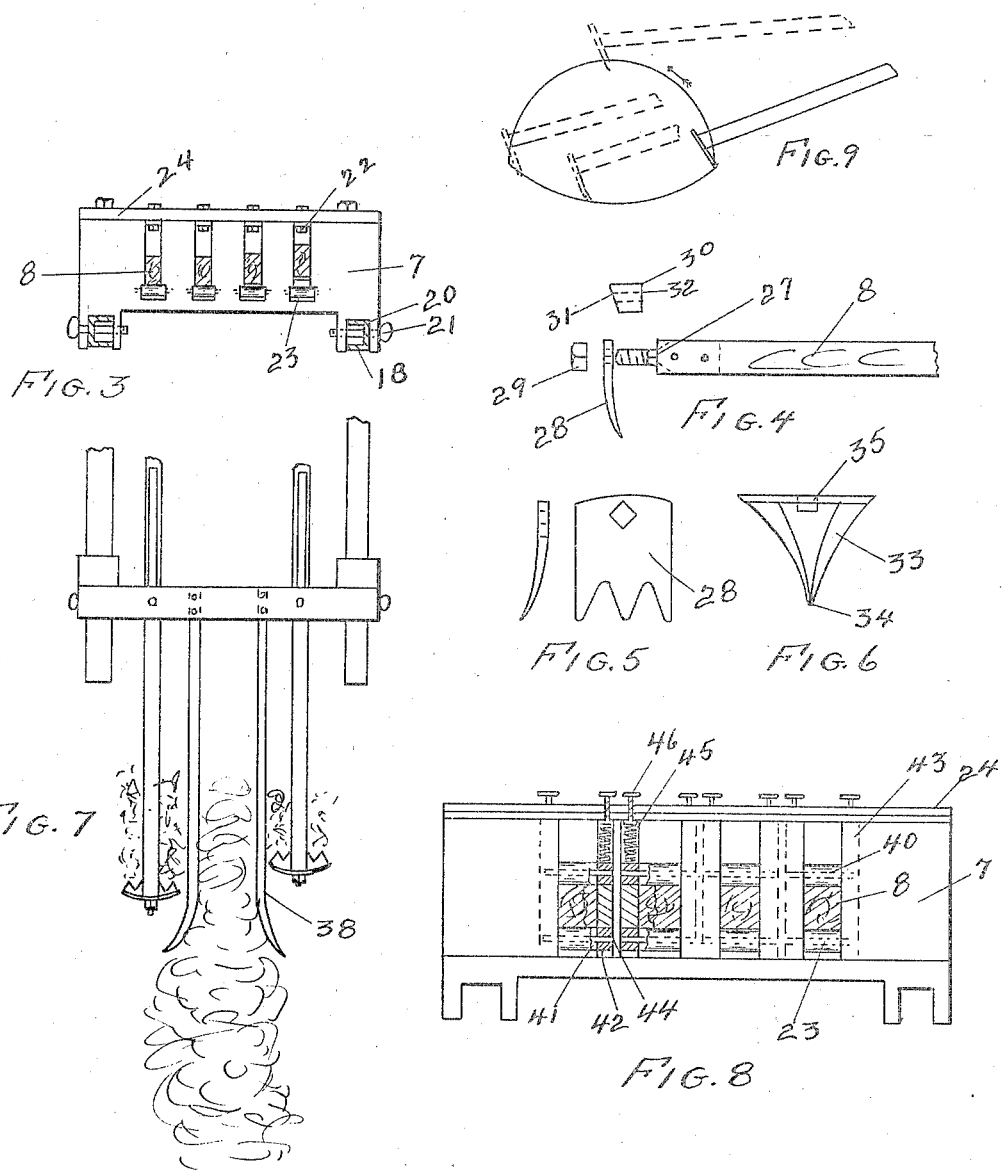

1,732,496

UNITED STATES PATENT OFFICE

SAMUEL HARRISON BRUNDIGE, OF SANTA ROSA, CALIFORNIA

METHOD OF CULTIVATING SOIL AND CULTIVATOR

Application filed May 20, 1925. Serial No. 31,599.

My invention comprises a method of cultivating soil and a cultivator to be utilized therefor. An object of my invention is to move slowly over the ground a cultivator having a series of cultivating tools or implements, the implements being attached to arms and having a somewhat rotary motion to lift the tools forward over the soil and draw them backward through the soil, thereby cultivating the soil in various ways according to the type of implements used.

My cultivator comprises a platform or frame mounted on wheels, having an engine thereon. A frame extends forward from the platform and forms at the end thereof an adjustable bearing for a series of cultivator arms. The inner ends of these arms are connected to a crank which is driven by the engine and the outer ends have attached thereto various cultivating implements as required for the different type of work. The inner ends of the arms have a circular motion on account of their connection with the crank, and the implements would likewise partake of a circular motion were they elevated above the soil. The implements, however, on striking the soil are prevented from following a true circular motion and have a dragging action through the soil, and as they are pulled out at the end of the stroke, are elevated and carried forward in a substantially circular movement. The cultivating action is to rapidly draw the cultivators through the soil and as the series of implements follow in succession parallel and overlapping lines, the soil is turned from side to side as well as being dug.

The implements tend to drag the carriage forward and this action may be prevented by utilizing a brake on the wheels or preferably having the wheels geared to the engine by a worm gear so that the worm gear itself and the connection to the engine retards the carriage. This drive connection to the engine may be utilized in moving the cultivator in its work and from one place to another. The machine is guided by an operator grasping handles at the rear of the cultivator from which position he may control the engine and change the speed of the cultivators as well as operate the drive connection from the engine to the wheels.

My invention will be more readily understood from the following description and drawings in which:—

Figure 1 is a side elevation of my cultivator in the direction of the arrow 1 of Figure 2.

Figure 2 is a plan view in the direction of the arrow 2 of Figure 1.

Figure 3 is a vertical cross-section of the cultivator on the lines 3—3 of Figures 1 and 2 in the direction of the arrows, showing in particular the guide bracket for the cultivator arm.

Figure 4 is a longitudinal detail of one of the cultivator arms showing a detachable implement.

Figure 5 is a front and side elevation of an implement similar to a hoe.

Figure 6 is a plan view of another type of implement in the form of a small plough.

Figure 7 is a partial plan similar to Figure 2 showing a pair of extension guides for lifting and holding a row of plants while the cultivator operates on both sides thereof.

Figure 8 is a cross-section similar to Figure 3, illustrating the arrangement of the cultivator arms through the guide bracket between lower and upper rollers.

Figure 9 is a diagrammatic longitudinal view illustrating the path of the cultivator implement and the manner of cultivating the soil.

Referring particularly to Figures 1 and 2 the cultivator as a whole is designated by the numeral 1 and is constructed with a carriage 2, having drive-wheels 3 and castor-wheels 4. The carriage supports an engine 5, preferably of the internal combustion type, and an implement-supporting structure 6 extends forwardly from the carriage and has mounted thereon a guide bracket 7 through which slide the cultivator arms 8, having attached thereto cultivating implements 9. The inner ends 10 of the cultivator arms are connected to a crank 11, supported in journals 12 attached to the carriage. Transmission gearing 13, designating the transmission as a whole, drives the crank from the engine. A second transmission 14 is connected from the engine to the main wheels 3.

A handle 15 is secured to the carriage and is adapted to be grasped by the operator in guiding and controlling the cultivator. Clutch operating handles 16 and 17 are connected respectively to the cultivator transmission and to the wheel transmission 13 and 14. It will be understood that suitable engine control devices are installed on the handles or convenient to the operator to govern the engine, such as a throttle and spark manipulating device.

The cultivating mechanism in detail is as follows, having reference particularly to Figures 1, 2, 3 and 4: The platform 6 preferably comprises a pair of channel bars 18 having a series of apertures 19 therethrough. The guide bracket 7 has a pair of downwardly extending yokes 20, fitting over the channels and adapted to be secured in different positions by bolts 21 through the yokes and the apertures in the channels. A series of slots 22, extending vertically, have at their lower ends anti-friction rollers 23, upon which the cultivator arms 8 may slide. A cross-bar 24 extends across the top of the slots and is bolted to the main portion of the bracket, and has attached thereto a series of resiliently pressed upper rollers 40 to be hereinafter described or springs 25 bearing on the upper surface of the cultivator arms. As above mentioned the inner ends 10 of the arms are secured to the crank shaft 11 by clamping bolts 26 or other suitable arrangement.

The various cultivating implements are preferably detachable from the cultivator arms. As shown in Figure 4, a screw-threaded stud 27 projects from the end of each arm to which may be attached a cultivating implement 28, by means of a nut 29. In order to give the implements a different position it is desirable to have a series of insertable washers 30 to clamp on the screw-threaded studs between the implements and the nuts of the arms. These have beveled faces 31 and 32 to give a different inclination to the implements. A plough-like implement is indicated by 33 in Figure 6, and is mounted with the point 34 facing the machine and clamped by a stud inserted through the hole 35.

The cultivator when operating in a field of crops growing in rows, may have attached to the sides thereof, a pair of guides 36 secured to the channels 18 by bolts or the like. These are curved inwardly at the outer end 37 to brush the plants aside, (see Figure 2). In Figure 7 the guides 38 are reversed and may be bolted to the bottom of the brackets 7. For cultivating on both sides of a row of growing crops the center cultivator arms would be removed so that the outside arms will cultivate close to the plants which are held upwardly by the guides.

It is manifest that the same guide members as used in Figures 1 and 2 could be utilized in Figure 7, or special guides could be made. In Figure 8, the construction of the upper rollers for the cultivator arms to reduce the friction is shown. The bracket 7 would be substantially the same as shown in Figure 3 and have lower rollers 23 below the arms 8 and a series of upper rollers 40. Both sets of rollers are illustrated with axles 41 fitting in bearing blocks 42. These may be inserted in channels 43 in the bracket. A space block 44 is placed between the upper and lower bearing blocks and is preferably the same height as the cultivator arms. A series of coiled springs 45, having adjusting screws 46 through the cross-bar 24, give the desired pressure on the upper roller and hence on the cultivator bars. It is manifest that by varying this pressure the cultivator implements may be made to operate at different depths in the soil.

The transmission gearing 13 comprises a pair of sprocket gears 50, which by means of the clutch 51, operated by the handle 16, may be thrown in and out of connection with the engine. These gears, through the medium of chains 52, drive large sprocket gears 53 of two different sizes, whereby variable speed may be obtained for revolving the crank shaft 11. The transmission 14 from the engine to the main wheels comprises a sprocket wheel 54, connected by a clutch 55 operated by the handle 17 to the engine shaft. By means of the sprocket chains 56, the drive is carried to a lower gear 57 and thence by suitable gearing and shaft 58 to the worm transmission 59, driving the main wheels. Any suitable type of gearing may be utilized for transmitting the engine motion from the engine shaft to the crank shaft 11 and to the main wheels. In ordinary operation in cultivation the engine is not needed to move the cultivator as the cultivating arms tend to pull it over the ground. The connection with the engine is mainly to retard the cultivator so that it will not cause undue wear on the brackets.

The method of cultivation may be stated as follows:—The engine operating the cultivator arms causes them to reach forward, strike the ground and be forced therein according to the tension on the springs, thence pulled backwards towards the machine and lifted out of the soil. The implements, on first contact with the soil, are not forced therein fully, but on the drag towards the machine are forced deeper in the soil and then gradually pulled out. In this action, in most soils where the implements can secure sufficient grip, they draw the carriage with the engine after them, it being necessary, as above described, to retard the carriage by applying brakes or by the worm or other retarding gearing to the engine. The machine will preferably operate at a high speed so that the succession of tools in reaching forward and overlapping each other, the successive stroke of each implement extending beyond the prior strokes, causes a thorough pulverization of the soil and the incorporation of a considerable body of air in intimate relation with the soil. By use of a plough-shaped device, as shown in Figure 6, the small furrows being formed will turn the soil over into the adjacent furrows and thus from side to side in succession.

It is manifest that my invention may be considerably modified to suit special circumstances, for instance, the machine may be made quite small for garden, vineyard or orchard work and also may be made in large sizes for the cultivation of large fields. The type of tools and the particular drive may also be changed.

Having described my invention, what I claim is:—

1. In a device of the type described, a supporting frame, a crank-shaft rotatably secured therein, longitudinally disposed cultivator arms pivotally secured to said crankshaft; arm guiding brackets slidable on said frame, means for securing the guiding brackets in an adjusted position spaced from said crankshaft; spring pressed rollers carried by said guiding brackets for yieldingly engaging with the upper side of said cultivator arms, and roller members engaging the lower side of said arms.

2. In a device of the type described, a frame movable over the ground, a crankshaft rotatably secured in said frame, longitudinally disposed cultivator arms pivotally secured to said crankshaft; arm guiding means mounted on the frame and being adjustable towards and away from said crankshaft, said guiding means consisting of upper and lower rollers, the upper rollers being yieldable, and means mounted on the frame to operate said crankshaft.

3. In a cultivator, a frame, a crankshaft rotatably mounted thereon, longitudinally extending cultivator arms pivotally secured to said crankshaft; guiding means for said cultivator arms, said guiding means being disposed on said frame below the level of said crankshaft and being spaced therefrom, said guiding means being adjustable towards and away from said crankshaft thereby regulating the movement of said arms.

4. In a cultivator, a frame, a crankshaft rotatably mounted thereon, longitudinally extending cultivator arms pivotally secured to said crankshaft; guiding means mounted on said frame below the level of said crankshaft and spaced therefrom, said guiding means being adjustable towards and away from said crankshaft and consisting of upper members yieldably pressing upon said arms and a lower member rigidly supported on the frame.

5. In a cultivator, a frame, a crankshaft rotatably mounted thereon, longitudinally extending cultivator arms pivotally secured to said crankshaft; brackets disposed on said frame and being adjustable thereon towards and away from said crankshaft, a roller guide member supported on said brackets and below said cultivator arms, and upper guide members on the bracket for yieldably pressing down said cultivator arms.

In testimony whereof I affix my signature.

SAMUEL HARRISON BRUNDIGE.